United States Patent [19]

Moore

[11] Patent Number: 4,519,831
[45] Date of Patent: May 28, 1985

[54] METHOD OF CONVERTING SEWAGE SLUDGE TO FERTILIZER

[75] Inventor: William P. Moore, Hopewell, Va.

[73] Assignee: Hawkeye Chemical Company, Clinton, Iowa

[21] Appl. No.: 542,431

[22] Filed: Oct. 17, 1983

[51] Int. Cl.$^3$ ............................................... C05F 7/00
[52] U.S. Cl. ........................................... 71/13; 71/28; 71/902
[58] Field of Search .......................... 71/12, 13, 28, 30

[56] References Cited

U.S. PATENT DOCUMENTS

| | | | |
|---|---|---|---|
| 2,877,599 | 3/1959 | Hebestreet et al. | 71/12 X |
| 2,977,214 | 3/1961 | McLellan | 71/12 X |
| 3,655,395 | 4/1972 | Karnemaat | 99/25 |
| 3,939,280 | 2/1976 | Karnemaat | 426/2 |
| 3,942,970 | 3/1976 | O'Donnell | 210/10 |
| 4,081,366 | 3/1978 | O'Donnell | 210/10 |
| 4,304,588 | 12/1981 | Moore | 71/28 |

*Primary Examiner*—Ferris H. Lander

[57] ABSTRACT

A method of converting sewage sludge solids into dense controlled release, attrition resistant fertilizer agglomerates is disclosed. The method is carried out by forming a fertilizer premix from dry sewage sludge solids and uncondensed liquid ureaform. Acidic material, preferably phosphoric acid, is distributed throughout the premix to bring the pH to between 4 and 6, and the premix is heated for 5 to 60 minutes to 120° C. The heated premix is compressed between solid surfaces at pressures between 500 and 10,000 pounds per square inch to form agglomerates.

The method is preferably carried out on a continuous basis using a heated blender and conveyor for blending and heating the fertilizer premix containing the sewage sludge solids, liquid ureaform, and phosphoric acid. Continuous compacting rollers are used to convert the premix to fertilizer agglomerates which may be readily broken up and screened to any desired fertilizer particle size range.

The fertilizer produced releases nitrogen safely and at a slow rate. Complete fertilizers may be produced by the method of this invention, and worthless, very light weight sewage sludge solids may be converted to useful plant food products.

15 Claims, No Drawings

METHOD OF CONVERTING SEWAGE SLUDGE TO FERTILIZER

BACKGROUND OF THE INVENTION

1. Field of the Invention

This invention relates to sewage sludge solids and the production of fertilizers from them, and more particularly to a new method for converting sewage sludge solids into attrition resistant, controlled release fertilizer agglomerates, or granules, by blending the sludge solids with liquid ureaform, heating, and mechanically compacting the blend.

2. Description of the Prior Art

The disposal of waste products has always been a technical and economic problem. Significant progress has been made in solving this problem by the development of improved sewage treatment methods. The activated sludge process is particularly important, whereby municipal, agricultural, and industrial sewage is converted to water suitable for return to the waterways, and to solids for disposal, by action of bacteria and enzymes. Sewage sludge solids are frequently recovered as dry solids for use as plant nutrients and micronutrients. The dried sewage sludge solids have soil conditioning properties. These dry solids are used as plant foods on some specialty crops such as grass, ornamental plants, and flowers. The low bulk densities, such as 25 pounds per cubic foot, and low nutrient concentrations, such as 6-2-0.5, preclude extensive use as a commercial fertilizer outside the immediate area of its production. The low bulk density also precludes its effective use for bulk blending with other more dense fertilizer materials to form complete fertilizers.

John Karnemaat, in U.S. Pat. No. 3,655,395 disclosed a process for treating industrial and municipal waste materials which are suspended or dissolved in water, by stepwise treatment with concentrated aqueous formaldehyde, nitric acid, and urea to form urea-formaldehyde condensation products. He dried the condensation products thus formed. His process constituted a significant step forward in the art of treating sewage sludge solids. The process undesirably required the use of aqueous sewage sludge solids which usually have an unpleasant odor, and strong aqueous formaldehyde solutions, about which questions have been raised regarding its toxicity and safe handling. Also, nitric acid is required in the process, and it generates nitrogen oxide gas which is toxic. Nitric acid poses a possibility of explosion when it is mixed with organic materials and heated, as in Karnemaat's drying operation.

Karnemaat, in U.S. Pat. No. 3,939,280, discloses an extension of his technology whereby poultry manure is converted to animal feeds by treatment with a catalytic amount of a non-toxic acid, such as sulfuric, phosphoric, citric, propionic and acetic, and a formaldehyde-supplying substance, and urea. He dried the mixture.

O'Donnell, in U.S. Pat. No. 3,942,970, discloses a system for, and a process of, producing a granular, high-nitrogen, odorless fertilizer from waste filter sludge material, which requires reducing the particle size of the sludge and reducing the moisture content of the ⅛ inch, or smaller, sludge particles to between 30 and 50 percent and adding acid to bring the pH of the sludge to between 3.0 and 5.0. O'Donnell prepared an alkaline N-methylol-urea aqueous prepolymer comprising mixed mono- and dimethylol urea by reacting 1.1 to 2.0 mols of urea with a mol of formaldehyde for 10 to 30 minutes at 30° to 80° C. He immediately reacted the aqueous prepolymer with the sludge at a temperature of 30° to 80° C. at a pH of between 3 and 5 with vigorous agitation to provide a granular reaction product of condensed urea formaldehyde polymer having a molecular weight of 300 or less, admixed with the dried sludge material of 3 to 10 percent moisture.

In U.S. Pat. No. 4,081,366 O'Donnell extended his technology to define a process for dewatering a solid reaction material from an aqueous solution containing organic waste material, by reacting in the manner of his previous technology and then adding dewatering and recovery steps. The dewatering and recovery is achieved by means of vacuum filtration.

The term ureaform liquid is used herein to indicate a urea formaldehyde solution having a molar excess of urea over formaldehyde. Those solutions as used in most fertilizer processes, are very reactive, as indicated by their use in O'Donnell's methods, initially containing formaldehyde available for reaction, and are generally not stable enough to store and ship. In U.S. Pat. No. 4,304,588 W. P. Moore disclosed a storage stable, concentrated, uncondensed, ureaform solution for use as a foliar fertilizer. This ureaform was prepared with an alkaline buffering catalyst, and with a carefully controlled pH and amounts of hexamethylene tetramine and/or ammonia to prevent condensation during storage. The term uncondensed, as used herein, indicates that the ureaform components remain substantially as monomeric chemical compounds containing little, or no, polymeric materials, or free formaldehyde.

Although progress has been made in the conversion of sewage sludge solids to fertilizers, the dry sewage solids produced by the methods of the prior art have low bulk densities, and the fertilizer particles produced have little structural integrity. These properties cause the sludge solids to segregate and to break-up, forming fines and dust when handled with commercial fertilizer blending or handling equipment. No method has been provided in the art for converting to dense fertilizers the very low density solids, obtained in such places as cyclone separators and fines screens in existing sewage sludge solids drying plants.

The methods of the prior art for producing low odor, slow release fertilizers from sewage sludge, require the treatment of shredded sludge filter cake with formaldehyde and urea, or freshly prepared mono- and dimethylolurea which must be used immediately after it is formed.

No methods have been disclosed for converting low density sewage sludge solids to attrition resistant, controlled release fertilizer agglomerates.

SUMMARY OF THE INVENTION

It is therefore a primary object of this invention to provide a method for converting sewage sludge solids into attrition resistant, controlled release fertilizer agglomerates.

It is a further object to provide attrition resistant, controlled release fertilizer agglomerate products.

It is a still further object to provide a continuous method of converting sewage sludge solids into a complete, dense, granular, fertilizer product.

These objects and others are achieved by the instant invention. In accordance with the method of this invention, a fertilizer premix is formed by comingling sewage sludge solids with uncondensed liquid ureaform, distributing an acidic material throughout the fertilizer premix, heating the acidified fertilizer premix, and compressing it between solid surfaces until controlled release, attrition resistant fertilizer agglomerates are formed.

The method of the instant invention may be applied to the continuous conversion of sewage sludge solids into attrition resistant, complete, granular fertilizers by blending, heating, and compacting the required ingredients in continuous equipment and comminuting the resulting fertilizer agglomerates into granules having the desired particle size range.

DETAILED DESCRIPTION OF THE INVENTION

The instant invention is directed to a method of converting sewage sludge solids to attrition resistant, controlled release agglomerates by blending the solids with uncondensed liquid ureaform and an acidic material to form an acidified fertilizer premix, heating the premix and then compressing it between solid surfaces until fertilizer agglomerates are formed, which are resistant to the attrition which usually occurs during the handling, transporting, and application of solid fertilizers.

The term agglomerate is used herein to indicate a particle composed of many smaller particles packed together in a hard, coherent form. The term controlled release fertilizer is used herein to denote fertilizers which release nitrogen slowly over a period of about 4-6 months in a manner to supply nitrogen as required for plant nutrition without the hazard of damage to the treated plants from excessive nitrogen release.

To obtain the desired controlled release, attrition resistant, fertilizer agglomerates, it is necessary to form a fertilizer premix by comingling sewage sludge solids containing 1 part of nitrogen with uncondensed liquid ureaform containing between 1 and 6 parts of nitrogen. It was discovered that when less than 1 part of ureaform nitrogen per part of sewage sludge nitrogen was used, the agglomerates formed were weak and not sufficiently attrition resistant to prevent physical degradation during normal fertilizer handling, transporting and application. The use of at least 1 part of ureaform nitrogen was necessary to produce fertilizer agglomerates having the desired fertilizer densities of 40-80 pounds per cubic foot. When more than 6 parts of ureaform nitrogen were used per part of sewage sludge nitrogen, the mixture formed would not release satisfactorily from the solid surfaces used to compress it, rendering the method impractical to operate in available commercial compacting equipment.

To achieve a desirable nitrogen release pattern from the fertilizer agglomerates of the instant invention, it was necessary to use an uncondensed ureaform liquid having a urea to formaldehyde mol ratio between 1 and 2. Mol ratios lower than 1 caused undesirably slow nitrogen release rates from the fertilizer agglomerates, and also causes sticking in the compacting equipment required for practical commercial operations. Nitrogen concentrations of about 32 percent are the highest which can readily be handled as a liquid, as required in the instant method, and concentrations lower than 20 percent cause the acidified fertilizer premix formed from the sewage sludge, liquid ureaform and acidified material to undesirably remain damp when it enters the compression step, causing excessive sticking on the solid compressing surfaces.

To achieve the physical consistency required to produce attrition resistant fertilizer agglomerates, it was found necessary to distribute sufficient acidic material throughout the fertilizer premix to bring the pH of the premix to between 4 and 6. When the pH was higher than 6, the compressed agglomerates were weak and not sufficiently resistant to attrition, and when it was lower than 4, the premix hardened before it could be compressed so that the agglomerates formed were inadequately cemented and had poor attrition resistance.

It was found necessary to heat the fertilizer premix under accurate conditions to produce fertilizer agglomerates which had adequate resistance to attrition. To produce agglomerates with good resistance to handling, shipping, and application the premix must be heated to between 60° and 120° C. for between 5 and 60 minutes, with temperature and heating times being somewhat interchangeable. Temperatures and heating times outside of the desired range do not produce agglomerates with acceptable physical properties regardless of the corresponding temperature or heating time. To assure that the premix is suitable, it may be heated until a test sample can be placed between solid surfaces and compressed at a pressure of 500 pounds per square inch to form a stable 1-inch diameter agglomerate which will withstand an evenly applied weight of 20 pounds without fracturing. The compacting test is conveniently conducted with a Carver-type laboratory press to produce a 1-inch diameter cylindrical agglomerate.

To form an attrition resistant fertilizer agglomerate it was found necessary to compress the heated fertilizer premix between solid surfaces which apply a pressure of between 500 and 10,000 pounds per square inch until attrition resistant controlled release fertilizer agglomerates are formed. Pressures lower than 500 pounds per square inch do not produce agglomerates with sufficient hardness, and the fertilizer agglomerates tend to stick to the solid compression surfaces when pressures higher than 10,000 pounds per square inch are used.

Fertilizer agglomerates having the best combination of resistance to attrition, method operability and nitrogen release properties were obtained when a storage stable ureaform solution was used which was prepared by the reaction of 1 mol of formaldehyde with between 1.5 and 1.8 mols of urea at 80° to 95° C. for 60 to 120 minutes with an alkali catalyst. The ureaform solution preferably contains between 0.8 and 2.0 percent free ammonia to prevent it from reacting too rapidly in the heating step of the instant invention. The ureaform solution performed best when its total nitrogen content was between 24 and 32 percent.

The method of this invention is ideally suited for use with dry, or nearly dry, sewage sludge solids, and with by-product streams from the drying of such solids. Solids containing 10 percent, or less, water were found to be preferable for use in the instant invention.

A wide variety of liquid, or solid, acid materials may be used, so long as they are capable of bringing the pH of the fertilizer premix to the desired pH range. It was found that mineral acids were desirable because they blended well and quickly brought the pH of the premix to the desired pH range. Liquid phosphoric acid was the preferred acid material because it effectively adjusted pH, and also served as a phosphate nutrient in the final fertilizer agglomerates.

In the stage of the method where the fertilizer premix is heated prior to compression to fertilizer agglomerates, best results were obtained where the premix was heated in a manner to produce a premix moisture of between 3 and 10 percent before it was compressed. At moistures below 3 percent, resistance to attrition of the agglomerates was less than optimum and sticking on the compressing surfaces became a problem as moisture was increased above 10 percent.

The preferable method of compressing the fertilizer premix into fertilizer agglomerates is to feed it between two rollers operating at a pressure between 1000 and 2000 pounds per square inch and a speed of between 5 and 40 revolutions per minute. The premix passes through an opening between the rollers amounting to between 0.05 and 0.50 centimeters. The compacted fertilizer agglomerates emerging downwardly from the rollers are usually somewhat thicker than the space between the rollers because of the resiliency of the process materials.

Best compaction of the fertilizer premix to fertilizer agglomerates was achieved where the surfaces of the two compacting rollers were each corrugated along the axis of the rolls, with individual corrugations having depths between 0.05 and 0.75 centimeters, and widths between 0.13 and 1.27 centimeters.

Another continuous method found suitable for forming the premix into fertilizer agglomerates requires the premix to pass between two rollers containing matching pockets, which pack the premix into discrete individual fertilizer agglomerates.

The fertilizer agglomerates produced by continuous roller compaction of fertilizer premix are usually larger than the fertilizer particles normally employed in commercial fertilization operations. It is preferred to form fertilizer granules by mechanically comminuting the fertilizer agglomerates of the instant invention. The agglomerates were found to be suitably comminuted by means of a rotary impact mill equipped with bars rotating at speeds between 1000 and 4000 revolutions per minute.

When the agglomerates were comminuted, it was found that the granules formed could readily by separated by screening into size ranges useful as fertilizers, and that the granules larger and smaller than the useful range could be returned for reprocessing. Reprocessing was best accomplished by returning to the blending stage of the process. If the amount of oversize material was low, the reprocessing could be achieved by simply returning the off-size particles for re-compacting.

The granular fertilizer product manufactured by the method of this invention had a particle size range of −6+16 U.S. Mesh and a bulk density of 52 pounds per cubic foot. When it was applied to soils for feeding crops, it did not cause burn, or damage of any type of the crop and was found to be still releasing nitrogen nutrition after 4 months in the soil.

I have found that the most advantageous method of converting sewage sludge solids into attrition resistant, complete granular fertilizer is a continuous method whereby a fertilizer premix is formed by continuously feeding dry sewage sludge solids containing one part nitrogen and a dry potassium fertilizer salt containing 0.5 to 5.0 parts potassium as $K_2O$, to a heated mixer and conveyor where they are comingled with a storage stable, uncondensed ureaform solution containing between 1 and 6 parts nitrogen. The heated mixer and conveyor may be chosen from those available commercially. They are usually a single unit comprising a steam jacketed trough containing a steam jacketed screw conveyor. The screw conveyor usually has several added paddles to provide additional mixing. The ureaform solution is best prepared by reaction of 1 mol of formaldehyde with between 1.5 and 1.8 mols of urea for between 60 and 120 minutes at a temperature between 80° and 95° C. under the influence of an alkali catalyst. The ureaform solution contains between 0.8 and 2.0 percent free ammonia and between 24 and 32 percent total nitrogen. Between 0.2 and 2.0 parts of phosphoric acid is continuously distributed into the premix in the heated mixer and conveyor so that the pH of the complete fertilizer mixture is adjusted to between 3 and 6. As the acidified fertilizer mixture passes through the mixer and conveyor it is heated until it reaches a temperature between 95° and 125° C. and sufficient water has been removed to decrease the moisture content of the fertilizer mixture to between 3 and 10 percent.

The dried fertilizer mixture may then be compacted by passing it between double corrugated rollers operating at pressures applied to produce between 2 and 15 tons of force per linear inch of contact between the rollers. The compacted fertilizer agglomerates are discharged continuously to a comminutor. The granular fertilizer particles are screened to produce a fertilizer product in the size range of −6+16 U.S. Mesh Size. This product was found to bulk blend well with other fertilizer ingredients, but also was found to be an excellent complete plant food containing N, P, K and many micronutrients.

MODE OF OPERATION OF THE INVENTION

Having described the basic concepts of the instant invention, reference is now made to the following exampls which are provided to illustrate the best method for carrying out the invention. All parts given herein are by weight unless otherwise stated.

EXAMPLE 1

A 100 gram sample of dried solids, produced in an activated sludge sewage treatment plant, was weighed into a glass mixing bowl. The material was dusty, and the individual particles had poor integrity so that relatively mild handling caused formation of additional dust by fracturing substantial numbers of the particles. Composition of the dried sewage sludge is tabulated as follows:

| Component | Wt % |
|---|---|
| Total Nitrogen, N | 6.0 |
| Water Insoluble Nitrogen, WIN | 5.6 |
| Phosphate, $P_2O_5$ | 2.0 |
| Potassium, $K_2O$ | 0.5 |
| Sulfur, S | 0.2 |
| Moisture, $H_2O$ | 3.5 |

To the solids were added 12.1 grams of finely ground potassium sulfate, and 86.6 grams of an uncondensed ureaform solution containing 30 percent nitrogen, 2 percent potassium as $K_2O$, and 1.1 percent free ammonia, and having a urea to formaldehyde mol ratio of 1.7 to 1. The solution is marketed commercially under the trade name Formolene. The solids and liquid were mixed thoroughly with a slow turning blender and 8.6 grams of superphosphoric acid containing 70% $P_2O_5$ was blended into the mixture. The damp mixture was placed in a flat tray to a depth of about 2 cm and placed in a laboratory oven operating at 107° C. with constant air circulation for heating.

The solids were removed from the oven after 30 minutes heating. After heating the solids contained 3 percent moisture. The hot solids were passed through a 4 mesh screen.

The solids were then formed into agglomerates by placing in a Carver Press and compressing with a cylinder pressure of 2000 pounds per square inch. Agglomerates were produced with dies having diameters of ½" and 1" and depths of about ⅜".

Resistance of the agglomerates to crushing and abrasion was good. The force required to crack or break a ½" diameter agglomerate averaged 18 pounds. The initial sewage solids had virtually no resistance to crushing. Some of the agglomerates were broken up and screened to a −6+16 mesh range.

This product was tumbled for 15 minutes in an 8-inch diameter laboratory drum at 60 revolutions per minute and produced essentially no dust by attrition.

Composition of the compacted product is tabulated as follows:

| Component | Wt % |
|---|---|
| Total Nitrogen, N | 15.9 |
| Water Insoluble Nitrogen, WIN | 9.1 |
| Phosphate, $P_2O_5$ | 4.3 |
| Potassium, $K_2O$ | 3.9 |
| Sulfur, S | 1.1 |
| Moisture, $H_2O$ | 2.8 |

The −6+16 mesh granules were applied to four 12-inch square flats of rye grass at the high fertilization rate of 3 pounds nitrogen per 1000 square feet. The color of the rye grass turned a deep green and no burning or damage occurred. The flat received only irrigation for a six-month period after application of the fertilizer and the grass level was maintained at about 2 inches high by periodic clippings. At the end of the 6-month test period, the rye grass remained green and healthy, indicating a continued release of nitrogen.

EXAMPLE 2

Light weight sewage sludge solids were recovered from cyclone separators operating on the effluent air stream from direct-fired rotary dryers, which dry the sewage sludge solids in he Milwaukee Metropolitan Sewage Treatment District Plant. The light weight sludge solids, referred to as "chaff" in the plant, are very light, having bulk densities of 5–10 pounds per cubic foot, as it is recovered from the cyclones. Analysis of the "chaff" is tabulated as follows:

| Component | Wt % |
|---|---|
| Total Nitrogen, N | 5.8 |
| Water Insoluble Nitrogen, WIN | 5.6 |
| Phosphate, $P_2O_5$ | 1.7 |
| Potassium, $K_2O$ | 0.5 |
| Iron, Fe | 5.1 |
| Moisture, $H_2O$ | 3.9 |

The "chaff" was charged to a chaff feed hopper from the cyclone separators at a rate of 700 pounds per hour. Particles passing through the 16 U.S. Mesh product screen, amounting to 455 pounds per hour were recycled to the chaff feed hopper.

Composition of the recycled material is tabulated as follows:

| Component | Wt % |
|---|---|
| Total Nitrogen, N | 15.0 |
| Water Insoluble Nitrogen, WIN | 7.4 |
| Phosphate, $P_2O_5$ | 6.2 |
| Potassium, $K_2O$ | 1.0 |
| Iron, Fe | 3.0 |
| Moisture, $H_2O$ | 3.9 |

The "chaff" and recycled "fines" were continuously comingled and fed from the chaff feed hopper to a steam heated screw dryer, which functioned as a heater and a conveyor. As these materials started through the dryer, they were evenly covered at a rate of 448 pounds per hour of a ureaform solution having a composition as follows:

| Component | Wt % |
|---|---|
| Nitrogen, N | 30.0 |
| Potassium, $K_2O$ | 2.0 |
| Water, $H_2O$ | 15.0 |
| Urea/HCHO mol ratio | 1.7/1 |
| Specific Gravity, 25° C. | 1.295 |
| Viscosity, Kinematic, 25° C. | 48 |

Green phosphoric acid was sprayed onto the mixture just after the ureaform solution was added. The phosphoric acid, containing 52 percent $P_2O_5$, was added at a rate of 116.0 pounds per hour. The mixture appeared damp just after the completion of the phosphoric acid addition, but it began to have a drier appearance shortly thereafter. Steam pressure was maintained on the heat transfer surfaces of the screw heater so that the mixture dried quickly and temperature of the mixture was held at 104° C. (220° F.) for about 10 minutes.

The mixture was continuously discharged from the dryer into the feed hopper of a double roll compactor and from there through the 3½ inch diameter corrugated rollers operating at a pressure of 1300 pounds per square inch. The gap between the rollers was 0.02 inch and the roller speed was 16 revolutions per minute. The compacted material issued from the bottom of the rollers as a semi-continuous belt of hard agglomerates and fell directly into a mill containing thin bars rotating at a speed of 4000 revolutions per minute. As the agglomerates of compacted material were sufficiently broken up, the particles fell through the screen on the mill into a vibratory screen containing a 6 U.S. Mesh screen on top and a 16 Mesh screen on the bottom.

Materials amounting to 455 pounds per hour, either finer or coarser than −6+16 U.S. Mesh, were combined and recycled to the chaff hopper, while the material in the −6+16 U.S. Mesh Size range was withdrawn as product at a rate of 1169 pounds per hour. Composition of the product is tabulated as follows:

| Component | Wt % |
|---|---|
| Total Nitrogen | 15.0 |
| Water Insoluble Nitrogen, WIN | 7.4 |
| Phosphate, $P_2O_5$ | 6.2 |
| Potassium, $K_2O$ | 1.0 |
| Iron, Fe | 3.0 |
| Moisture | 3.9 |
| Bulk Density, 46 lbs/ft³ | |
| pH of 10% solids in water, 5.9 | |
| Percent of N from Sewage Sludge, 23.2 | |
| Percent of N from Ureaform, 76.8 | |
| Percent of $P_2O_5$ from Sewage Sludge, 16.2 | |
| Percent of $P_2O_5$ from Phosphoric Acid, 83.8 | |

| | |
|---|---|
| Net Percent Conversion of Ureaform N to WIN in Product, 35.2 | |

Light weight "chaff" was recovered, as in Example 1, and blended with another waste stream from the Milwaukee Metropolitan Sewage Treatment District Plant in a weight ratio of 2.33 to 1.00. The other waste stream consisted of fine material screened from the regular dried sewage sludge solids. It was too fine for effective use, causing irritating dust and high handling losses. The blended "chaff" and "fines" had a bulk density of 11 pounds per cubic foot, and a composition tabulated as follows:

| Component | Wt % |
|---|---|
| Total Nitrogen | 6.0 |
| Water Insoluble Nitrogen, WIN | 5.6 |
| Phosphate, $P_2O_5$ | 2.0 |
| Potassium, $K_2O$ | 0.5 |
| Iron, Fe | 5.1 |
| Sulfur, S | 0.2 |
| Moisture | 4.0 |

The "chaff"-"fines" blend was charged to the chaff feed hopper of Example 2 at a rate of 530 pounds per hour. Final product particles passing through the 16 U.S. Mesh product screen, amounting to 320 pounds per hour, were recycled and blended with the feed materials in the chaff feed hopper.

Potassium sulfate (0-0-52-16S) was also blended into the solids in the chaff hopper at a rate of 55 pounds per hour. The combined solids ("chaff"-"fines"-recycle-potassium sulfate) were fed to the same steam heated screw dryer (Bepex Thermascrew) at a rate of 905 pounds per hour. These solid materials were evenly blended with the same ureaform solution used in Example 2 at a rate of 338 pounds per hour, and then blended throughout with green phosphoric acid containing 52 percent $P_2O_5$, at a rate of 77 pounds per hour. The agitation in the screw dryer made the initially damp mixture homogenous-appearing, and the steam pressure on the screw dryer was maintained so that the mixture heated quickly. The retention time in the screw dryer was about 15 minutes at 105° C. The material had a dry, free-flowing appearance as it was discharged from the screw dryer into the same double corrugated roller compactor used in Example 2. Pressure on the rollers, operating at 14 revolutions per minute was maintained at 1300 pounds per square inch.

The compacted material issued from the bottom of the rollers as a semi-continuous stream of hard flake-like agglomerates having a slight amount of plasticity. These agglomerates fell directly into the mill used in Example 2, operating at 4000 revolutions per minute, and from there through the mill's outlet screen to a vibratory screen containing 6 and 16 U.S. Mesh Screens.

Materials amounting to 320 pounds per hour, either finer or coarser than $-6+16$ U.S. Mesh, were combined and recycled to the chaff hopper, while the material in the $-6+16$ mesh size range was withdrawn as product at a rate of 951 pounds per hour. Composition of the product is tabulated as follows:

| Component | Wt % |
|---|---|
| Total Nitrogen, N | 14.0 |
| Water Insoluble Nitrogen, WIN | 7.8 |
| Phosphate, $P_2O_5$ | 5.3 |
| Potassium, $K_2O$ | 4.0 |
| Iron, Fe | 2.8 |
| Sulfur, S | 1.0 |
| Moisture, $H_2O$ | 4.0 |
| Bulk density, 42 lbs/ft$^3$ | |
| pH of 10% solids in water, 5.1 | |
| Percent of N from Sewage Sludge, 23.8 | |
| Percent of N from Ureaform, 76.2 | |
| Percent of $P_2O_5$ from Sewage Sludge, 20.9 | |
| Percent of $P_2O_5$ from Catalyst, 79.1 | |
| Net Percent Conversion of Ureaform N to WIN, 43.9 | |

In a Rota-Tap screening device 200 grams of the $-6+16$ mesh product was placed on a 24 mesh screen and set to shaking for a period of 15 minutes to simulate vigorous handling, shipping, and application operations. At the end of the shaking period, 1.5 grams of material had passed through the 24 mesh screen onto the pan, indicating that less than 1 percent of dust was formed in 15 minutes of vigorous handling.

I claim:

1. A method of converting sewage sludge solids in controlled release, attrition resistant fertilizer agglomerates comprising:
   (a) forming a fertilizer premix by comingling sewage sludge solids containing 1 part of nitrogen with uncondensed liquid ureaform containing between 1 and 6 parts nitrogen and having a urea to formaldehyde mol ratio of between 1 and 2 and a nitrogen concentration between 20 and 32 percent; said ureaform being prepared by reaction of 1 mol of formaldehyde with between 1.5 and 1.8 mols urea at 80° to 95° C. for 60 to 120 minutes under the influence of an alkali catalyst, and contains between 0.8 and 2.0 percent free ammonia and between 24 and 32 percent total nitrogen;
   (b) distributing sufficient acidic material throughout the fertilizer premix to acidify it to a pH of between 4 and 6;
   (c) heating the acidified fertilizer premix to a temperature between 60° and 120° C. for between 5 and 60 minutes;
   (d) compressing the heated fertilizer premix between solid surfaces at a pressure between about 500 and 10,000 pounds per square inch until controlled release, attrition resistant, fertilizer agglomerates are formed.

2. The method of claim 1 wherein the sewage sludge solids comingled with the ureaform liquid contains less than about 10 percent moisture.

3. The method of claim 1 wherein the acid material distributed into the fertilizer premix is a mineral acid.

4. The method of claim 1 wherein the acid material distributed into the fertilizer premix is phosphoric acid.

5. The method of claim 1 wherein the acidified fertilizer premix is heated to dry the premix until its moisture content is between about 3 and 10 percent.

6. The method of claim 1 wherein the acidified fertilizer premix is heated until a sample of the premix may be compressed in a 1-inch diameter Carver Press at 500 psi pressure to produce an agglomerate which will withstand an evenly applied weight of at least 20 pounds without fracturing.

7. The method of claim 1 wherein the solid surfaces compressing the fertilizer premix consist of two rollers operating at pressures between 1000 and 2000 pounds per square inch applied to the fertilizer premix as it passes continuously through an opening amounting to between 0.05 and 0.50 centimeters between the rollers operating at between about 5 and 40 revolutions per minute in directions to carry the fertilizer premix downward through the opening between the rollers.

8. The method of claim 7 wherein the surfaces of the two rollers are each corrugated, the individual corrugations having depths between about 0.05 and 0.75 centimeters and widths between 0.13 and 1.27 centimeters.

9. The method of claim 7 wherein the surfaces of the two rollers contain matching pockets which compress the fertilizer premix into individual fertilizer agglomerates.

10. The method of claim 1 wherein the fertilizer agglomerates are comminuted by mechanical means to form fertilizer granules.

11. The method of claim 10 wherein the mechanical means used to comminute the fertilizer agglomerates to fertilizer granules is a rotary impact mill containing bars rotating at between 1000 and 4000 revolutions per minute.

12. The method of claim 10 wherein the fertilizer granules formed by comminuting the agglomerates are separated by screening into product size ranges which are useful as fertilizers and the granules larger and smaller than the useful range are reprocessed.

13. The granular fertilizer product from the method of claim 1.

14. A continuous method of converting sewage sludge solids into attrition resistant, complete, granular, fertilizers, comprising:
(a) forming a fertilizer premix by continuously feeding dry sewage sludge solids, containing one part nitrogen and a dry potassium fertilizer salt containing about 0.5 to 5.0 parts potassium as $K_2O$ to a heated mixer and conveyor, where they are comingled with a storage stable, uncondensed ureaform solution containing between 1 and 6 parts nitrogen, the ureaform solution being prepared by reaction of 1 mol of formaldehyde with between 1.5 and 1.8 mols of urea for between 60 to 120 minutes at a temperature of 80° to 95° C. under the influence of an alkali catalyst, and containing between 0.8 and 2.0 percent free ammonia and between 24 and 32 percent total nitrogen;
(b) continuously distributing between 0.2 and 2.0 parts phosphoric acid into the premix in the heated mixer and conveyor so that the pH of the complete fertilizer mixture is adjusted to between 3 and 6;
(c) heating the acidified fertilizer mixture as it passes through the mixer and conveyor until it reaches a temperature between 95° and 125° C. and sufficient water has been removed to dry the moisture content of the fertilizer mixture discharged from the mixer and conveyor to between 3 and 10 percent;
(d) compacting the dried fertilizer mixture by passing it between double corrugated rollers operating at pressures required to produce between 2 and 15 tons of force per linear inch of contact between the rollers, and discharging the compacted fertilizer agglomerates to a comminutor;
(e) comminuting and screening the fertilizer agglomerates to produce fertilizer granules having a particle size range of about −6+16 U.S. Mesh Size.

15. The granular fertilizer product from the Method of claim 14.

* * * * *